(12) United States Patent
Moriyama et al.

(10) Patent No.: US 6,370,842 B1
(45) Date of Patent: Apr. 16, 2002

(54) WRAPPING MATERIAL PROCESSOR AND PROCESS FOR MANUFACTURING PACKING CONTAINER

(75) Inventors: Yasuyuki Moriyama, Funabashi; Yukihisa Kumeta, Tokyo; Shigeo Katsumata, Yokohama, all of (JP)

(73) Assignee: Tetra Laval Holdings & Finance, S.A. (CH)

( * ) Notice: Subject to any disclaimer, the term of this patent is extended or adjusted under 35 U.S.C. 154(b) by 0 days.

(21) Appl. No.: 09/463,771
(22) PCT Filed: Aug. 12, 1998
(86) PCT No.: PCT/JP98/03599
  § 371 Date: Feb. 1, 2000
  § 102(e) Date: Feb. 1, 2000
(87) PCT Pub. No.: WO99/08863
  PCT Pub. Date: Feb. 25, 1999

(30) Foreign Application Priority Data

Aug. 13, 1997 (JP) .............................. 9-218799

(51) Int. Cl.$^7$ .............................. B65B 61/18; B65B 9/00
(52) U.S. Cl. .............................. 53/412; 53/451
(58) Field of Search .............................. 53/133.1, 133.2, 53/133.3, 133.7, 133.8, 141, 550, 551, 552, 412, 451, 452, 477

(56) References Cited

U.S. PATENT DOCUMENTS

| 3,254,427 | A | * | 6/1966 | Dorr | .......................... | 53/141 |
| 4,034,537 | A | * | 7/1977 | Reil et al. | ...................... | 53/141 |
| 4,848,063 | A | * | 7/1989 | Niske | .......................... | 53/451 |
| 5,029,430 | A | * | 7/1991 | Davis | .......................... | 53/141 |
| 5,044,140 | A | * | 9/1991 | Iwano et al. | ................... | 53/551 |
| 5,067,311 | A | * | 11/1991 | Andersson | .................... | 53/551 |
| 5,484,101 | A | * | 1/1996 | Hedberg | ....................... | 220/258 |
| 5,813,197 | A | * | 9/1998 | Aguzzoli | ...................... | 53/551 |
| 5,836,143 | A | * | 11/1998 | Yoshida et al. | ................ | 53/551 |
| 5,848,517 | A | * | 12/1998 | Yamamoto et al. | ........... | 53/551 |
| 6,079,185 | A | * | 6/2000 | Palaniappan et al. | ....... | 53/133.2 |
| 6,192,660 | B1 | * | 2/2001 | Moriyama et al. | ............ | 53/141 |

\* cited by examiner

Primary Examiner—Rinaldi I. Rada
Assistant Examiner—Louis Huynh
(74) Attorney, Agent, or Firm—Lorusso & Loud

(57) ABSTRACT

An object is to prevent roughening of a rupture surface of a packaging material (12) that is formed upon opening of a spout (21) through application of an external force. There are provided transport means for transporting a layered packaging material (12) that is formed of a paper substrate and resin films and that has a rupture area (52) at a location corresponding to that of opening means; a seal unit for sealing the packaging material (12); and heating means disposed on the upstream side of the seal unit in the transport direction of the packaging material (12) such that the heating means is opposed to an innermost layer of the packaging material (12) in order to heat the packaging material (12). In this case, after being heated and melted, the resin film of the packaging material (12) is gradually cooled. As a result, thermoplastic resin that constitutes the resin film is crystallized and becomes brittle. Accordingly, when an external force is applied by use of the opening means to thereby open the spout (21), the resin film does not stretch. As a result, the packaging material (12) can be easily ruptured, and the rupture surface of the packaging material (12) is prevented from being roughened, because the resin film does not have ruptured and stretched portions coexisting in a mixed manner.

5 Claims, 6 Drawing Sheets

WRAPPING MATERIAL PROCESSOR AND PROCESS FOR MANUFACTURING PACKING CONTAINER

TECHNICAL FIELD

The present invention relates to a packaging material processing apparatus and to a method of producing packaging containers.

BACKGROUND ART

Conventional packaging containers have a spout for pouring liquid food contained therein. In order to form such a spout, a punch hole serving as a spout is formed in a packaging material used for forming a packaging container; an inner film is bonded to the packaging material from the reverse side in order to cover the punch hole; a pull-tab seal is bonded to the packaging material from the front side; and the inner film and the pull-tab seal are welded together through application of heat.

When the pull-tab seal is peeled off in order to open the packaging container, the inner film is ruptured together with the pull-tab seal. Thus, the spout is opened.

However, in the conventional packaging container, the peeled-off pull-tab seal is thrown away, resulting in environmental pollution.

To overcome this problem, there may be employed a packaging container in which a rupture area formed of a thin wall portion is defined at a spout portion of the packaging material which will become a spout. The packaging material can be easily ruptured upon application of an external force to the rupture area in order to open the spout.

However, the above-described packaging material has a layered structure in which a paper substrate layer, a gas barrier layer, and the like are sandwiched between an outermost layer and an innermost layer, which are formed of resin film such as polyethylene film. Therefore, when the spout is opened upon application of an external force, the resin film sometimes stretches, with the result that the resin film has ruptured portions and stretched portions coexisting in a mixed manner, and thus the rupture surface of the packaging material is roughened.

An object of the present invention is to solve the above-described problems of conventional packaging containers and to provide a packaging material processing apparatus and a method of producing packaging containers, which apparatus and method prevent roughening of a rupture surface of a packaging material that is formed upon opening of a spout through application of an external force.

DISCLOSURE OF THE INVENTION

To achieve the above object, a packaging material processing apparatus of the present invention comprises: transport means for transporting a layered packaging material that is formed of a paper substrate and resin films and that has a rupture area at a location corresponding to that of opening means; a seal unit for sealing the packaging material; and heating means disposed on the upstream side of the seal unit in the transport direction of the packaging material such that the heating means is opposed to an innermost layer of the packaging material in order to heat the packaging material.

In this case, after being heated and melted, the resin film of the packaging material is gradually cooled. As a result, thermoplastic resin that constitutes the resin film is crystallized and becomes brittle.

Accordingly, when an external force is applied to the rupture area by use of the opening means to thereby open a spout, the resin film does not stretch. As a result, the packaging material can be easily ruptured, and the rupture surface of the packaging material is prevented from being roughened, because the resin film does not have ruptured and stretched portions coexisting in a mixed manner.

In another packaging material processing apparatus of the present invention, the heating means has a plurality of hot-air jetting openings formed in a surface that faces the packaging material.

A method of producing packaging containers according to the present invention comprises the steps of: feeding a layered packaging material that is formed of a paper substrate and amorphous resin films and that has a rupture area at a location corresponding to that of opening means; sealing the packaging material in the longitudinal direction to form a tubular packaging material; charging contents into the tubular packaging material; sealing the tubular packaging material transversely at predetermined intervals and cutting the tubular packaging material at transversely sealed portions to form a container having a preliminary shape; folding, along folding lines, the container having a preliminary shape into a final shape; and attaching a lid member to the rupture area.

Further, the method comprises the steps of heating a portion, including at least the rupture area, of the resin film of the packaging material by heating means at an upstream location in a predetermined processing zone; and gradually cooling the portion of the resin film heated by the heating means at a downstream location in said processing zone in order to bring that portion into a crystalline state.

In another method of producing packaging containers according to the present invention, at least one of the resin films constituting the layered packaging material is formed of a thermoplastic resin that reversibly changes state between an amorphous state and a crystalline state.

In still another method of producing packaging containers according to the present invention, the above-described cooling is performed by natural heat radiation within a chamber of a charging apparatus.

In still another method of producing packaging containers according to the present invention, the above-described heating means continuously heats a strip-shaped portion of the packaging material including the rupture area.

In still another method of producing packaging containers according to the present invention, the above-described heating means selects and intermittently heats the rupture area of the packaging material.

BEST MODE FOR CARRYING OUT THE INVENTION

The embodiments of the present invention will next be described in detail with reference to the drawings.

Figure 2:
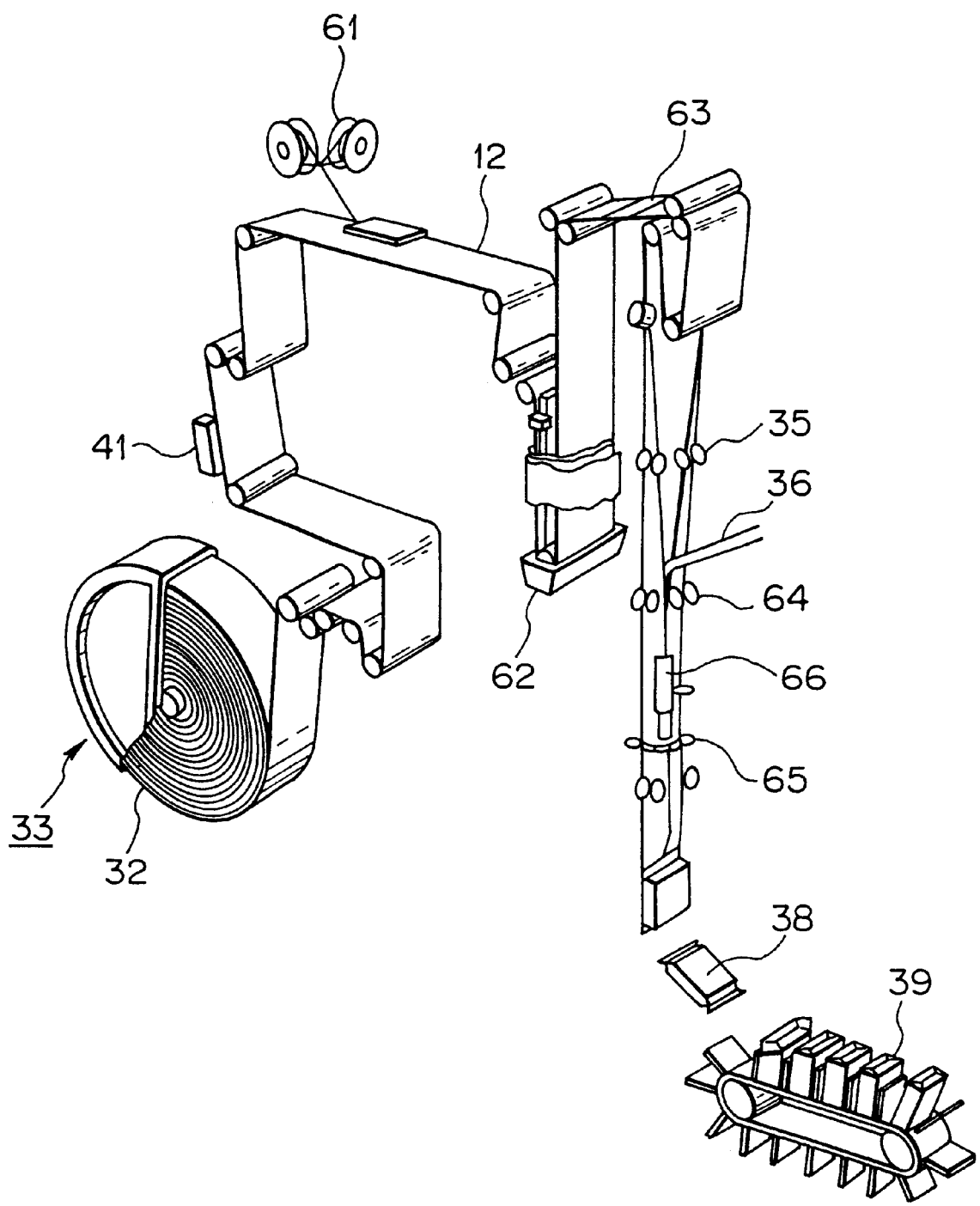
FIG. 2 is a schematic view of a charging apparatus according to the first embodiment of the present invention.

FIG. 2 is a schematic view of a charging apparatus according to the first embodiment of the present invention.

In FIG. 2, numeral 12 denotes a web-shaped packaging material formed of a flexible laminate. The packaging material 12 has a layered structure and is formed of an unillustrated paper substrate, a resin film (resin layer) that covers the outer surface of the paper substrate and serves as an outermost layer, and a resin film that covers the inner surface of the paper substrate and serves as an innermost layer, and the like. If necessary, a gas barrier layer formed of aluminum foil, resin film having a gas barrier property, or the like is provided between the paper substrate and the innermost layer.

In the present embodiment, at least one of the resin films, which constitutes the packaging material 12; i.e., the resin film that constitutes the innermost layer is formed of a thermoplastic resin that reversibly changes state between an amorphous state and a crystalline state.

An example of such thermoplastic resin is a polyolefin resin such as polyethylene, polypropylene, or ethylene copolymer. More specifically, the resin film is a film formed of a polyethylene resin such as low density polyethylene (LDPE) which is easily crystallized, linear low density polyethylene (LLDPE) having a resistance against liquid food (e.g., oil resistance, acid resistance, and permeation resistance), metallocene-polyethylene, or intermediate density polyethylene; or a coextruded film containing these resins.

The resin film having a gas barrier property is formed of at least one of deposition film of an inorganic oxide, ethylene vinyl alcohol copolymer (EVOH) film, Nylon (trade name) film, polyvinylidene chloride film, and polyvinylidene chloride coated film. The inorganic oxide deposition film is formed such that a thin layer of inorganic oxide such as silicon oxide, tin oxide, zinc oxide, indium oxide, titanium oxide, or aluminum oxide is formed on a film of a thermoplastic resin such as polyolefin, Nylon, polyester, polyvinyl alcohol, or the like, through vacuum deposition, sputtering, chemical vapor deposition, or plasma chemical vapor deposition (PCVD).

The packaging material 12 is produced through use of an unillustrated packaging material production apparatus and is set on the charging apparatus in the form of a roll 32. The packaging material 12 is unwound by a supply unit 33 and is transported through the charging apparatus when an unillustrated transport arm serving as transport means is operated. Folding lines are formed in advance at predetermined locations on the packaging material 12. Further, a rupture area is defined in advance at a portion where an unillustrated lid is to be attached. A resin film that constitutes the innermost layer of the packaging material 12 is in an amorphous state.

Subsequently, the packaging material 12 undergoes pretreatment in a processing zone that is set in advance within the charging apparatus. That is, at an upstream location within the processing zone, a portion, including at least the rupture area, of the resin film that constitutes the innermost layer of the packaging material 12 is heated and melted by a heater 41 serving as heating means. Subsequently, at a downstream location within the processing zone; i.e., on the downstream side of the heater 41 in the transport direction of the packaging material 12, the resin film is gradually cooled by means of natural heat radiation within an unillustrated chamber of the charging apparatus as the packaging material 12 is transported. At this time, the thermoplastic resin of the resin film is crystallized to thereby be brought into a crystalline state.

Within the chamber, an unillustrated strip applicator is disposed on the downstream side of the heater 41 in the transport direction of the packaging material 12. When the packaging material 12 is sealed along the longitudinal direction, the strip applicator jets hot air toward the edge portion of the packaging material 12, and bonds a strip tape 61 to the edge portion of the packaging material 12. Also, a hydrogen peroxide tank 62 is disposed on the downstream side of the strip applicator in the transport direction of the packaging material 12. For sterilization purpose, the packaging material 12 is immersed into hydrogen peroxide that is contained in the hydrogen peroxide tank 62 and heated to about 60° C.

Further, an air knife 63 is disposed on the downstream side of the hydrogen peroxide tank 62 in the transport direction of the packaging material 12. Hot air is jetted from the air knife 63 to the packaging material 12 in order to remove hydrogen peroxide adhering to the packaging material 12.

Therefore, on the downstream side of the heater 41 in the transport direction of the packaging material 12, the atmosphere within the chamber is maintained in a relatively warm state suitable for gradually cooling the heated resin film. The above-described processing zone is provided within the chamber to be located between the supply unit 33 and a longitudinal seal unit 66, and the resin film is gradually cooled on the downstream side of the heater 41.

The packaging material 12 whose innermost layer has been partially crystallized in the above-described manner is guided by chamber guides 35 and forming rings 64 and 65. Between the forming rings 64 and 65, the packaging material 12 is sealed along the longitudinal direction into a tubular shape by the vertical seal unit 66.

While the tubular packaging material 12 is transported downward, liquid food, which serves as contents to be charged, is supplied and charged into the packaging material 12 from above via a metering pipe 36. Subsequently, the packaging material 12 is pressed from both sides by unillustrated seal jaws to thereby be sealed transversely at predetermined intervals.

Subsequently, the transversely sealed portions; i.e., transverse seal portions, are cut to form a container 38 having a preliminary shape. The container 38 is then folded along the above-described holding lines to obtain a container 39 having a predetermined final shape. Subsequently, an unillustrated lid is attached to the container 39. In this way, a plurality of brick-shaped packaging containers each containing a consistent amount of liquid food are completed.

Figure 3:
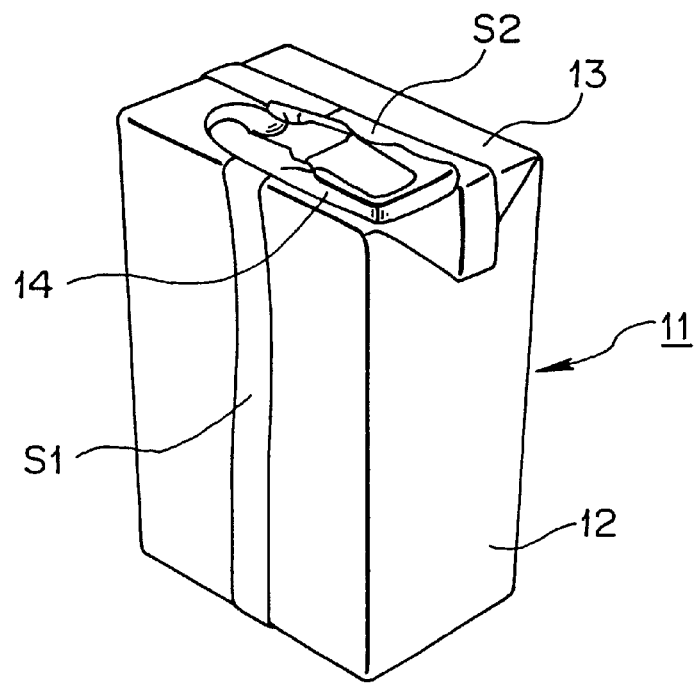
FIG. 3 is a schematic view of a packaging container according to the first embodiment of the present invention.
Figure 4:
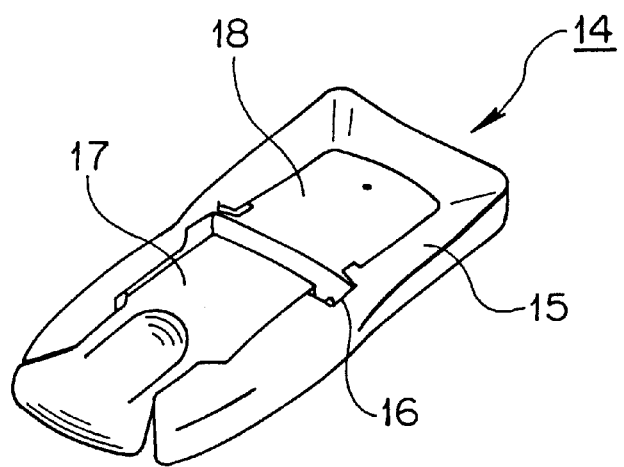
FIG. 4 is a perspective view of a pull cap according to the first embodiment of the present invention.
Figure 5:
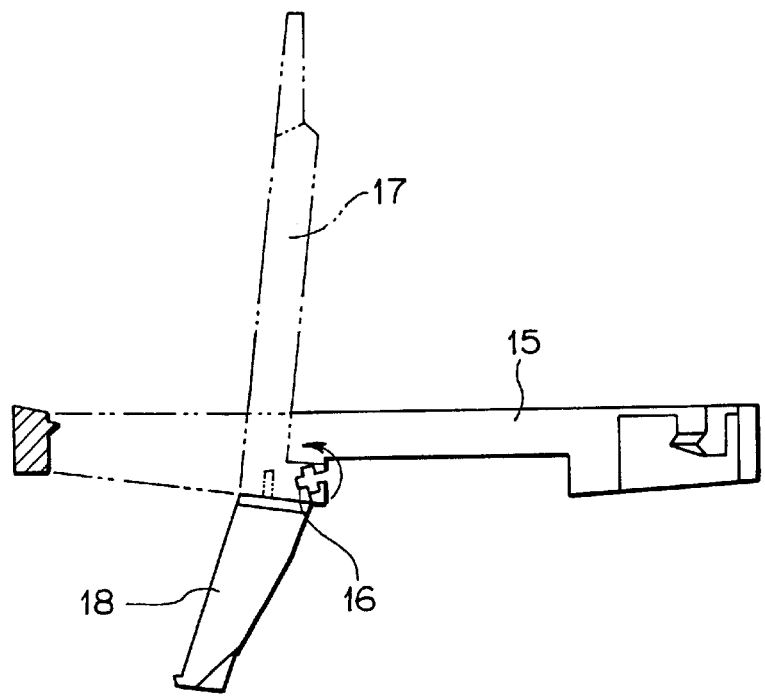
FIG. 5 is a view for describing action of the pull cap according to the first embodiment of the present invention.

FIG. 3 is a schematic view of a packaging container according to the first embodiment of the present invention; FIG. 4 is a perspective view of a pull cap according to the first embodiment of the present invention; FIG. 5 is a view for describing action of the pull cap according to the first embodiment of the present invention; and FIG. 6 is a view showing a state in which the packaging container according to the first embodiment of the present invention is opened.

In these drawings, numeral 11 denotes a packaging container that is formed through formation of the packaging material 12 into a brick-like shape. Unillustrated liquid food is contained in the packaging container 11. Symbol S1 denotes a longitudinal seal portion, while symbol S2 denote a transverse seal portion.

A lid 14 is welded to a predetermined lid attachment portion, for example, to a corner portion of a top wall 13 of the packaging container 11. The lid 14 is integrally formed of a resin such as polyethylene resin. The lid 14 has a body 15 having a "U"-like shape, a pull tab 17 which is supported to be swingable about a hinge 16, and an opening flap 18 which is supported to be swingable about the hinge 16 and is rotated in an interlocked manner as the pull tab 17 rotates. The opening flap 18 serves as opening means.

Figure 6:
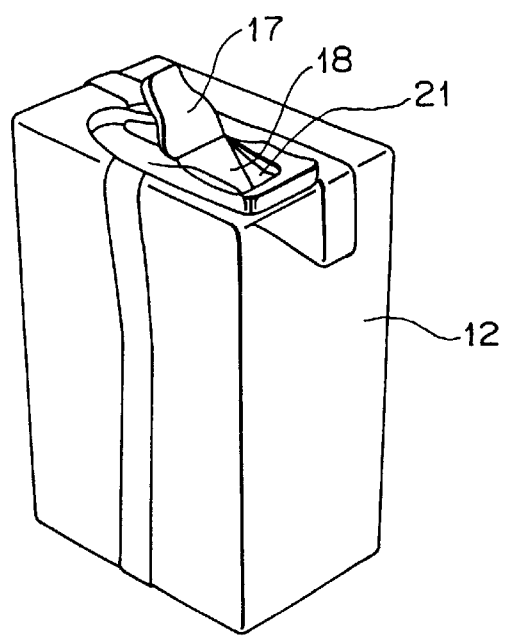
FIG. 6 is a view showing a state in which the packaging container according to the first embodiment of the present invention is opened.

In this case, as shown in FIGS. 5 and 6, when the pull tab 17 is pulled up and turned, the opening flap 18 is rotated in an interlocked manner as the pull tab 17 rotates. As a result, an external force acts on the packaging material 12 of the packaging container 11, so that the packaging material 12 is ruptured to open a spout 21.

For this purpose, a rupture area having a profile roughly corresponding to the shape of the opening flap 18 is formed in the packaging material 12 at a portion corresponding to the opening flap 18. When the rupture area is depressed with the rotation of the opening flap 18, the rupture area is ruptured to open the spout 21. For example, the rupture area is formed by cutting the paper substrate and the outermost layer along the shape of the spout 21 while maintaining the innermost layer uncut.

When the packaging material 12 is ruptured through rotation of the opening flap 18, the resin film stretches as the rupture area is depressed upon rotation of the opening flap 18, because the resin film that constitutes the innermost layer has elasticity. As a result, ruptured portions and stretched portions are formed in a mixed manner in the resin film, so that the rupture surface of the packaging material 12; i.e., the inner circumferential edge of the spout 21 is roughened, or thin film remains at the inner circumferential edge, which prevents smooth pouring of the liquid food.

In order to solve the above-described problem, in the present embodiment, a portion, including at least the rupture area, of the resin film of the packaging material 12 fed by the supply unit 33 (FIG. 2) is heated from the innermost-layer side by the heater 41 and is thereby melted. Subsequently, that portion of the resin film is gradually cooled within the chamber, so that the thermoplastic resin is crystallized.

Figure 1:
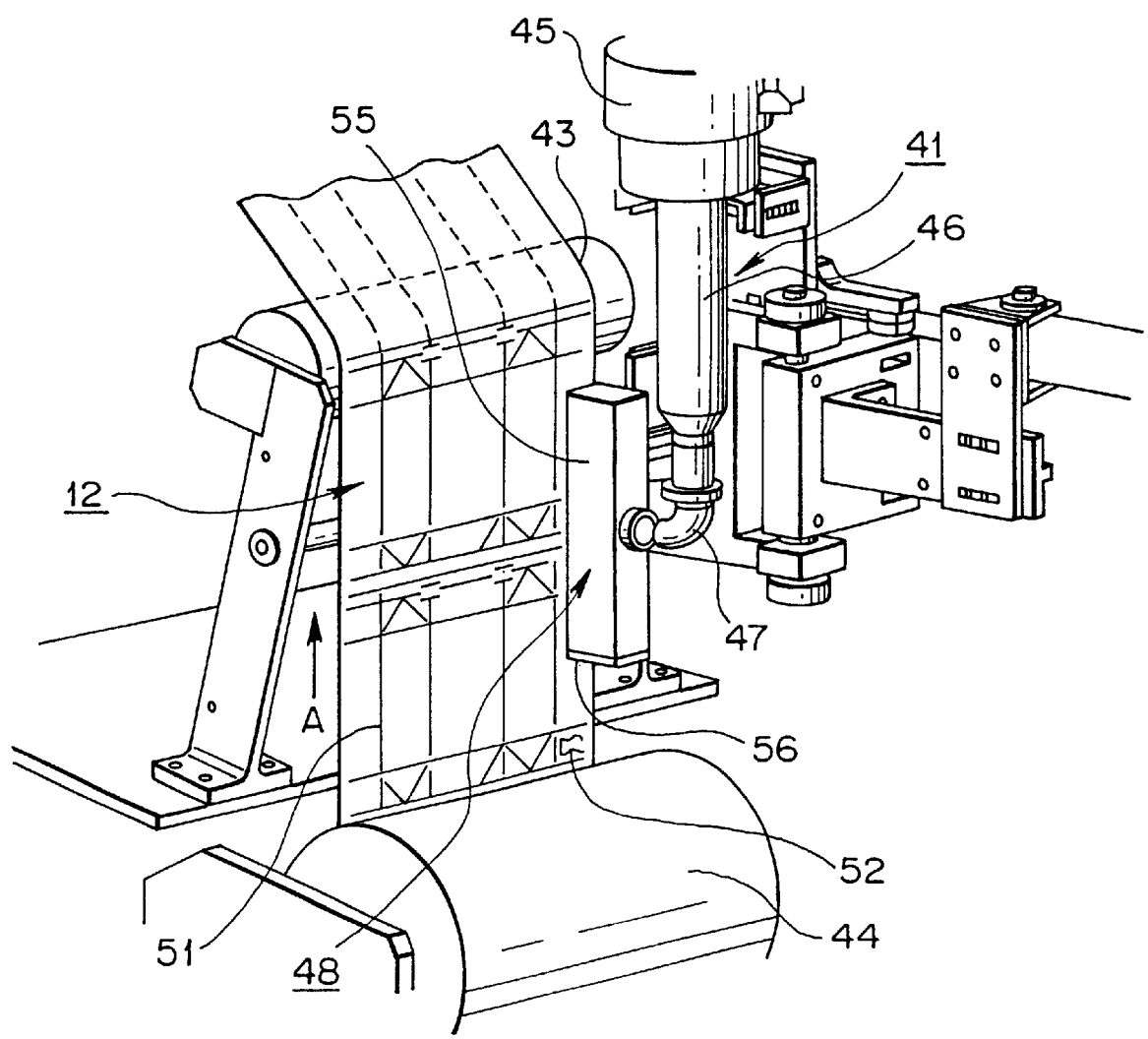
FIG. 1 is a view showing the arrangement of a heater according to the first embodiment of the present invention.
Figure 7:
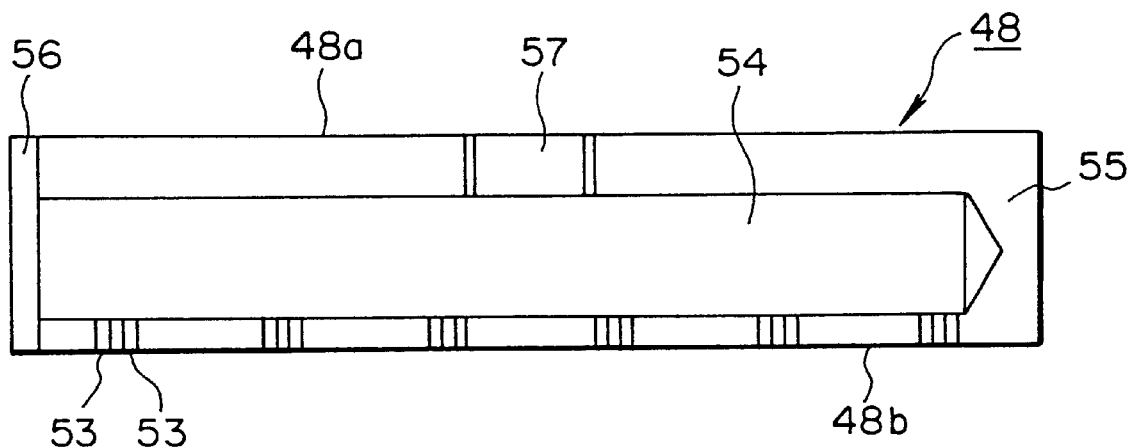
FIG. 7 is a cross-sectional view of a nozzle of the heater according to the first embodiment of the present invention.
Figure 8:
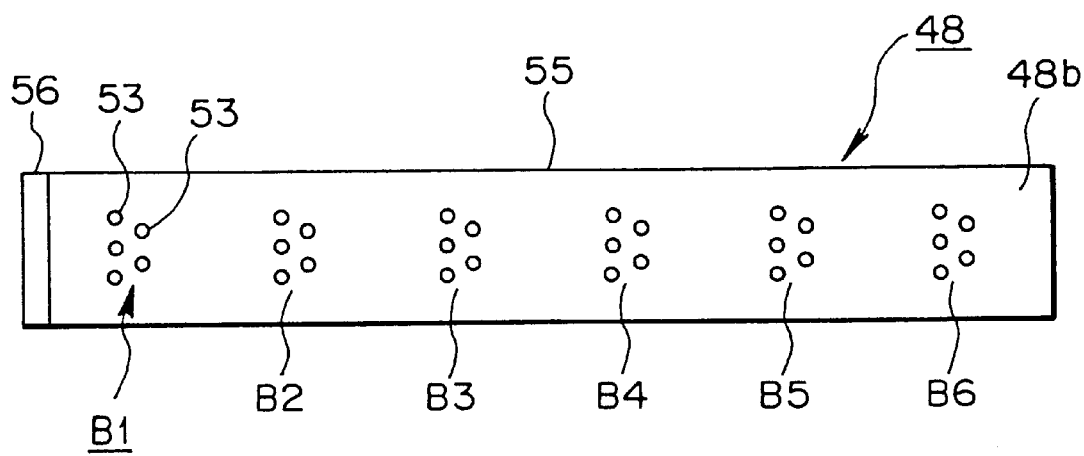
FIG. 8 is a plan view of the nozzle of the heater according to the first embodiment of the present invention.

FIG. 1 is a view showing the arrangement of a heater according to the first embodiment of the present invention; FIG. 7 is a cross-sectional view of a nozzle of the heater according to the first embodiment of the present invention; and FIG. 8 is a plan view of the nozzle of the heater according to the first embodiment of the present invention.

In these drawings, numeral 12 denotes a web-shaped packaging material (partially shown) transported in the direction of arrow A. Numeral 41 denotes a heater disposed to face the innermost layer of the packaging material 12, and numeral 43 and 44 denote guide rollers. The heater 41 includes a heat source section 45 accommodating an unillustrated heating element, ducts 46 and 47 for guiding hot air generated at the heat source section 45, and a nozzle 48 for jetting to the packaging material 12 hot air guided by the ducts 46 and 47. Numeral 51 denotes a folding line, and numeral 52 denotes a rupture area.

The nozzle 48 includes a block 55 in which an air chamber 54 is formed and which has an open end and a closed bottom, and a plate 56 for closing the open end of the block 55. A hole 57 communicating with the duct 47 is formed at the center of one surface 48a of the block 55, and a plurality of hot-air jetting openings 53 are formed in the other surface 48b of the block 55 that is opposed to the rupture area 52. Therefore, hot air generated at the heat source section 45 is guided by the ducts 46 and 47 to enter the air chamber 54 and is jetted toward the rupture area 52 from the hot-air jetting openings 53. As a result, the resin film serving as the innermost layer is heated and melted.

In the present embodiment, the hot air is continuously jetted toward the packaging material 12 while the packaging material 12 is being transported. Therefore, the heater 41 continuously heats a strip-shaped portion of the packaging material 12 including the rupture area 52. The rupture area 52 of the packaging material 12 may be selected and the hot air may be intermittently jetted toward the rupture area 52 while the packaging material 12 is being transported. In this case, the heater 41 selects and intermittently heats the rupture area 52 of the packaging material 12.

Subsequently, the packaging material 12 is gradually cooled within the chamber of the charging apparatus. As result, the thermoplastic resin is crystallized, so that it becomes brittle.

The hot-air jetting openings 53 are divided into groups each including five hot-air jetting openings 53. Thus, as shown in FIG. 8, the hot-air jetting openings 53 form six groups B1–B6 which are aligned along the axial direction of the other surface 48b.

In the present embodiment, the hole 57 is formed at the center of the one surface 48a. However the hole 57 may be formed at the end portion near the plate 56.

In the present embodiment, the nozzle 48 is formed of stainless (SUS304), and the other surface 48b facing the rupture area 52 is coated with fluorine resin in order to prevent adhesion of the resin film which constitutes the innermost layer of the packaging material 12.

Further, when the packaging material 12 is transported at a speed that enables production of the packaging containers 11 (FIG. 3) at a rate of 6000 packages/minute, hot air of 210°–240° C. is generated at the heat source section 45 and is jetted from the hot-air jetting openings 53. In the present embodiment, the hot air is jetted under a pressure of 1.3–1.5 mPa and at a flow rate of 15.5–16 Nm$^3$/h.

As described above, the thermoplastic resin that forms the resin film of the innermost layer of the packaging material 12 is crystallized, so that the thermoplastic resin becomes brittle. Therefore, when an external force is applied to the packaging material 12 by use of the opening flap 18 in order to open the spout 21 (FIG. 6), the resin film does not stretch. Accordingly, the packaging material 12 can be easily ruptured and it is possible to prevent mixed formation of ruptured portions and stretched portions in the resin film, so that roughing of the inner circumferential edge of the spout 21 is prevented.

Whereas a force of 22 N is required to rupture the packaging material 12 if the packaging material 12 has not been heated, a less force of 20 N is required to rupture the packaging material 12 if the packaging material 12 has been heated. As described above, after heating, the packaging material 12 can be easily ruptured.

In the present embodiment, the resin film that constitutes the innermost layer is formed of a thermoplastic resin that changes its state between an amorphous state and a crystalline state. However, the resin film that constitutes the outermost layer, the resin film that constitutes the gas barrier layer, or the like may be formed of such a thermoplastic resin. In this case, since the thermoplastic resin of the resin film that constitutes the outermost layer, the resin film that constitutes the gas barrier layer, or the like is crystallized and becomes brittle, the packaging material 12 can be easily ruptured and roughening of the inner circumferential edge of the spout 21 is prevented.

Next, a second embodiment of the present invention will be described.

Figure 9:
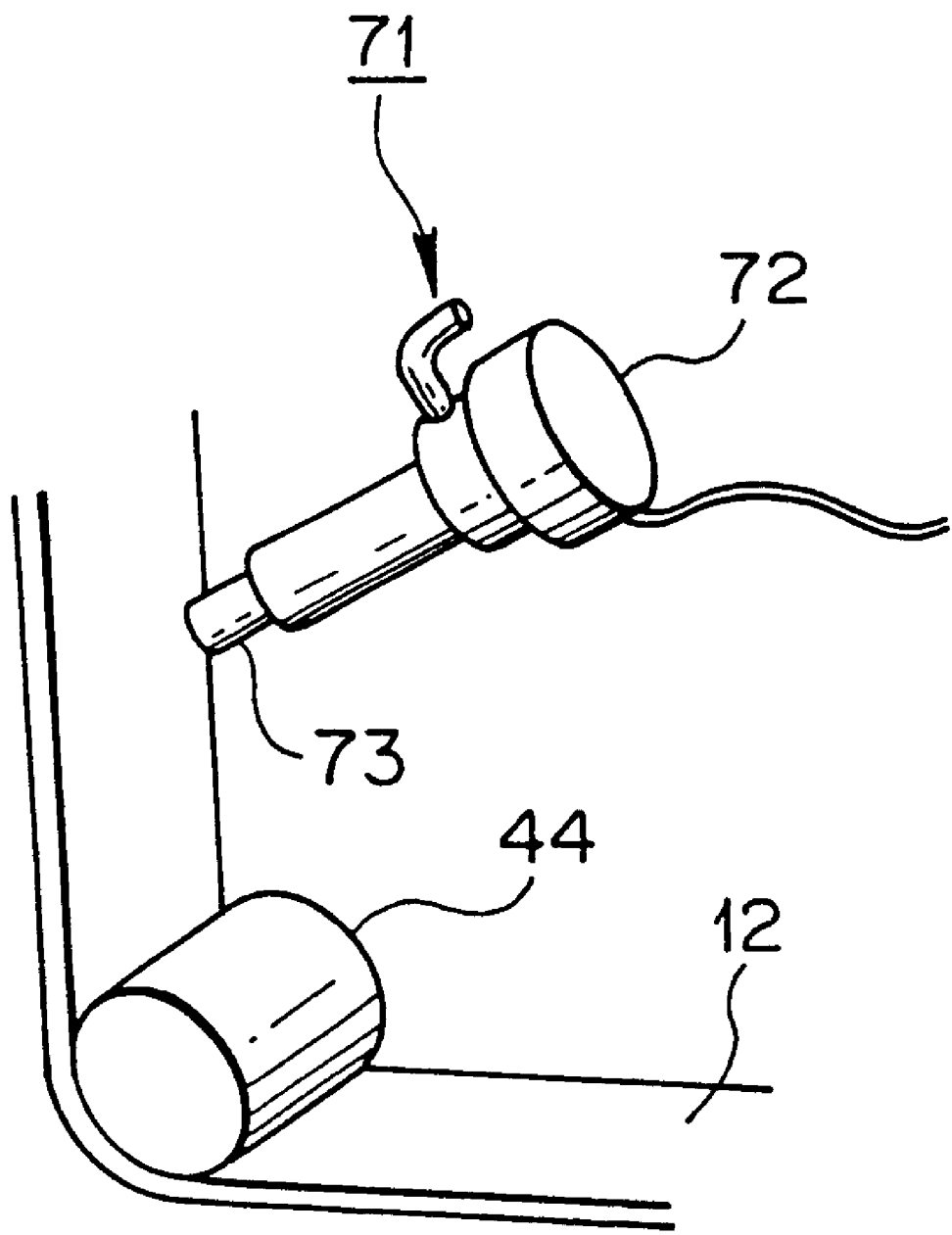
FIG. 9 is a view showing the arrangement of a heater according to the second embodiment of the present invention.

FIG. 9 is a view showing the arrangement of a heater according to the second embodiment of the present invention.

In FIG. 9, numeral 71 denotes a spot heater, which is composed of a tubular section 72 in which an unillustrated electrical heater is disposed, and a nozzle 73. Hot air generated by the electrical heater is jetted from the nozzle 73 toward an unillustrated rupture area of the packaging material 12. As a result, the resin film that constitutes the innermost layer is heated and melted. Numeral 44 denotes a guide roller.

The present invention is not limited to the above-described embodiments. Numerous modifications and variations of the present invention are possible in light of the spirit of the present invention, and they are not excluded from the scope of the present invention.

INDUSTRIAL APPLICABILITY

The present invention is applicable to an apparatus for producing a packaging material used for forming packaging containers.

What is claimed is:

1. A method of producing packaging containers comprising the steps of:

(a) feeding, in a longitudinal direction, a layered packaging material that is formed of a paper substrate and amorphous resin films and that has a rupture area at a location corresponding to that of opening means;

(b) sealing said packaging material in the longitudinal direction to form a tubular packaging material;

(c) charging contents into the tubular packaging material;

(d) sealing the tubular packaging material transversely at predetermined intervals to form transverse seals and cutting the tubular packaging material at the transverse seals to form a container having a preliminary shape;

(e) folding, along folding lines, the container having a preliminary shape into a final shape;

(f) attaching a lid to the rupture area;

(g) heating a portion, including at least the rupture area, of the resin film of the packaging material to a melting temperature of the resin film by heating means at an upstream location in a predetermined processing zone; and (h) gradually cooling said portion of the resin film heated and melted by the heating means at a downstream location in said processing zone in order to bring said portion into a brittle and crystalline state.

2. A method of producing packaging containers according to claim 1, wherein at least one of the resin films constituting the layered packaging material is formed of a thermoplastic resin that reversibly changes state between an amorphous state and a crystalline state.

3. A method of producing packaging containers according to claim 1, wherein said cooling is performed by natural heat radiation within a chamber of a charging apparatus.

4. A method of producing packaging containers according to claim 1, wherein said heating means continuously heats a strip-shaped portion of the packaging material including the rupture area.

5. A method of producing packaging containers according to claim 1, wherein said heating means selects and intermittently heats the rupture area of the packaging material.

* * * * *